(No Model.)
H. B. SLEDGE.
Animal Trap.
No. 233,811.        Patented Oct. 26, 1880.
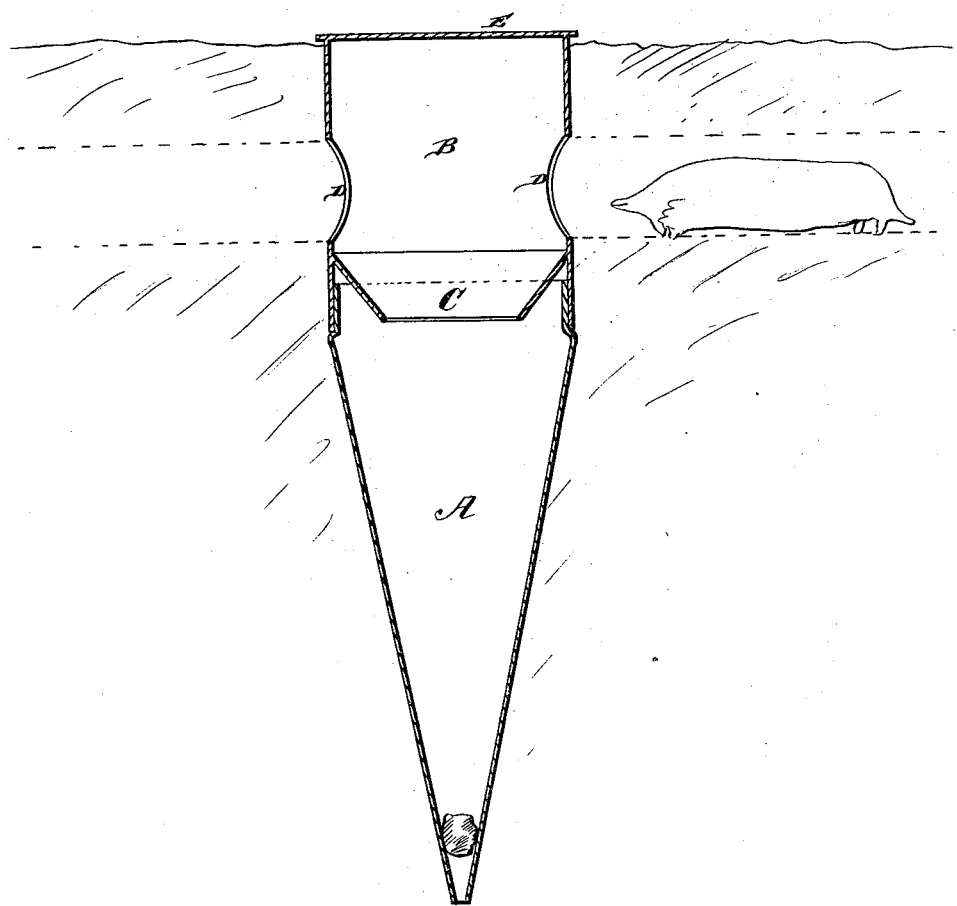
WITNESSES
Robert Everett
Chas. G. Page.
INVENTOR
Henry B. Sledge.
J. Clement Smith
ATTORNEYS
N. PETERS, PHOTO-LITHOGRAPHER, WASHINGTON, D. C.

UNITED STATES PATENT OFFICE.

HENRY B. SLEDGE, OF WELDON, NORTH CAROLINA, ASSIGNOR OF ONE-HALF TO A. L. STAINBACK, OF SAME PLACE.

ANIMAL-TRAP.

SPECIFICATION forming part of Letters Patent No. 233,811, dated October 26, 1880.

Application filed April 30, 1880. (No model.)

*To all whom it may concern:*

Be it known that I, HENRY B. SLEDGE, of Weldon, in the county of Halifax and State of North Carolina, have invented certain new and useful Improvements in Mole-Traps; and I do hereby declare that the following is a full, clear, and exact description of the construction and operation of the same, reference being had to the annexed drawing, making a part of this specification, and to the letters and figures of reference marked thereon.

The figure of the drawing is a representation of a vertical central section of my mole-trap.

The object of this invention is to produce a cheap and efficient mole-trap.

The trap constructed in accordance with my improvement consists of two sections, the one conical and the other cylindrical shaped, the latter section being provided with entrances for the mole, and with an inclined or cone-shaped flange, which prevents the escape of the mole after it has fallen down into the conical part of the trap.

In the drawing, A designates the conical-shaped part or section of the trap, and B the cylindrical-shaped part or section thereof. This section B is provided with a cone-shaped flange, C, and with openings D D.

In using this strap the conical part A is driven through the burrow of a mole into the ground until the openings in the cylindrical part are in line with the passage of the burrow, or the trap may be set into the ground in advance of the burrow where the mole has temporarily suspended operations.

As the mole reaches the trap and enters the opening in the cylindrical part of the trap the mole will be attracted by a bait—say a peanut or a piece of potato—previously placed in the bottom end of the conical part of the trap, and will fall down head first and be wedged in said conical part A. The flange C will prevent all possibility of the ascent of the mole, and thus it will be held prisoner until the trap is taken from the ground, after which the sections may be taken apart and the mole shaken out and killed.

I do not confine myself to any material for the trap, since it might be made of tin, zinc, sheet metal, or wood.

The top portion of the cylindrical part of the trap is covered, as at E, so as to exclude light from the interior of the trap after it has been set in the ground.

I am aware that cans having funnel-shaped mouths have been placed in the bottom of a ditch to entrap the chinch-bug, as shown in Patent No. 155,644; also, that a roach and mouse trap has been provided with a funnel-shaped entrance, through which the roach or mouse passes to the bait, and is prevented from passing out at the point of entrance, as shown in Patent No. 119,435. I do not, however, lay claim to either of these constructions.

What I claim is—

A mole-trap composed of the conical part A and the cylindrical part B, provided with the cone-shaped flange C, the cover E, and the openings D D, combined and operating substantially as and for the purposes set forth.

In testimony that I claim the above I have hereunto subscribed my name in the presence of two witnesses.

HENRY BASCOM SLEDGE.

Witnesses:
R. C. LASSITER,
M. F. HART.